(12) United States Patent  
Knudtson

(10) Patent No.: US 11,067,499 B2  
(45) Date of Patent: Jul. 20, 2021

(54) BACKGROUND GENERATION IN FTIR SPECTROSCOPY

(71) Applicant: Thermo Electron Scientific Instruments LLC, Madison, WI (US)

(72) Inventor: Peter Edward Knudtson, Fitchburg, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 0 days.

(21) Appl. No.: 16/802,692

(22) Filed: Feb. 27, 2020

(65) Prior Publication Data

US 2020/0271572 A1 Aug. 27, 2020

Related U.S. Application Data

(60) Provisional application No. 62/811,108, filed on Feb. 27, 2019.

(51) Int. Cl.  
*G01N 21/35* (2014.01)  
*G01J 3/45* (2006.01)

(52) U.S. Cl.  
CPC .............. *G01N 21/35* (2013.01); *G01J 3/45* (2013.01); *G01N 2021/3595* (2013.01)

(58) Field of Classification Search  
CPC ... G01N 21/35; G01N 2021/3595; G01J 3/45; G01J 3/0297; G01J 3/453  
See application file for complete search history.

(56) References Cited

U.S. PATENT DOCUMENTS

| | | | | |
|---|---|---|---|---|
| 5,446,681 A | * | 8/1995 | Gethner ............... | G01N 21/359 702/27 |
| 6,118,529 A | * | 9/2000 | Spragg ..................... | G01J 3/28 356/307 |
| 2013/0090865 A1 | * | 4/2013 | Sun .......................... | G06F 17/00 702/30 |

* cited by examiner

*Primary Examiner* — David P Porta  
*Assistant Examiner* — Meenakshi S Sahu

(57) ABSTRACT

An embodiment of a method of automatically generating a background measurement in a spectrometer is described that comprises the steps of: collecting a plurality of candidate scans in the spectrometer; determining for each of the plurality of candidate scans if the candidate scan correlates to an orthonormal basis set that is associated with a recent background description; saving each candidate scan that correlates to the orthonormal basis set as a background scan in a scan cache; and generating a new background measurement from a plurality of the background scans stored in the scan cache if a current background measurement is older than a preselected time interval.

20 Claims, 4 Drawing Sheets

BACKGROUND GENERATION IN FTIR SPECTROSCOPY

CROSS-REFERENCE TO RELATED APPLICATIONS

This application claims the priority benefit of U.S. provisional patent application Ser. No. 62/811,108 filed Feb. 27, 2019, the entire disclosure of which is incorporated herein by reference.

FIELD

Aspects of this disclosure relate generally to the field of FTIR spectroscopy, and more particularly, to automatically generating a background for use with an FTIR spectrometer.

BACKGROUND

Fourier transform infrared (FTIR) interferometric spectrometers are widely used in the analysis of chemical compounds. By measuring the absorption of infrared radiation by an unknown sample at various wave lengths in the infrared spectrum and comparing the results with known standards, these instruments generate useful information with respect to the chemical makeup of the unknown sample. In a typical FTIR spectrometer, infrared radiation from an infrared emitting source is collected, passed through an interferometer, passed through the sample to be analyzed, and brought to focus on an infrared detector. The interferometer may be a Michelson type interferometer.

The interferometer system, in combination with the sample, modulates the intensity of the infrared radiation that impinges on the detector, and thereby forms a time variant intensity signal. It is the function of the detector to convert this time variant intensity signal to a corresponding time varying current. The current, in turn, is converted to a time varying voltage, which is presented to an analog-to-digital converter and then stored as a sequence of digital numbers to be processed in a processor associated with the spectrometer.

The FTIR spectrometer may include a moving mirror element that modulates the analytical radiation used by the instrument to study samples. The moving mirror allows a time-domain interferogram or profile to be generated which, when analyzed, allows high resolution frequency-domain spectra to be produced, which can be compared to a background spectrum, or profile.

In FTIR spectroscopy, the sample and background interferograms are processed with a Fast Fourier Transform (FFT) to convert the data from positional data relative to the interferometer's zero-path-difference to frequency domain data. The sample data at each wavelength is then ratioed against the corresponding background data at the same wavelength to remove the instrument's background profile. The array of ratioed values at each wavelength becomes the sample spectrum that is presented to the user and used to produce analytical results.

It is desirable to always have a usable background measurement, available when a user walks up to an instrument to make a sample measurement. Since the background profile of the instrument changes slightly over time when the ambient temperature, humidity and other conditions change, it is not recommended to use the same background measurement for long periods of time, even if none of the settings on the instrument have changed. This drifting of the background profile also makes it difficult to recognize when there is no sample present in the instrument at any given point of time.

The term "background profile" (sometimes referred to as an "instrument profile") as used herein generally refers to one or more conditions embodied in the current instrument state, that may include but are not limited to the ambient temperature/humidity within the instrument; the settings currently in effect on the instrument such as the source and detector selected and the stroke length of the interferometer; any accessories installed in the instrument; or screens/filters present in the instrument. The conditions can change through user interaction or just drift over time and may or may not be captured with a background measurement.

The term "background measurement" (sometimes referred to as a "background") as used herein generally refers to a plurality of coadded background scans acquired to capture the current instrument profile. The background scans are typically acquired with no sample in place and the coadded background scans are converted to the frequency domain with an FFT before being used with a sample measurement to produce a sample spectrum.

It would be desirable to provide a way of automatically providing a background measurement for use with an FTIR spectrometer that reduces or overcomes some or all of the difficulties inherent in prior known processes. Particular objects and advantages will be apparent to those skilled in the art, that is, those who are knowledgeable or experienced in this field of technology, in view of the following disclosure and detailed description of certain embodiments.

SUMMARY

An embodiment of a method of automatically generating a background measurement in a spectrometer is described that comprises the steps of: collecting a plurality of candidate scans in the spectrometer; determining for each of the plurality of candidate scans if the candidate scan correlates to an orthonormal basis set that is associated with a recent background description; saving each candidate scan that correlates to the orthonormal basis set as a background scan in a scan cache; and generating a new background measurement from a plurality of the background scans stored in the scan cache if a current background is older than a preselected time interval.

In some aspects of the invention the background description includes instrument settings and/or an interferogram peak magnitude. Also, in some cases the candidate scans are forward scans. Further, in some implementations the preselected time interval is between approximately 30 minutes and approximately 60 minutes, or the preselected time interval includes an interval between the determination of two new background scans.

In some instances, 256 background scans are saved in the scan cache. Additionally, the orthonormal basis set may include a matrix of numbers of 10 vectors that could be generated using a Gram-Schmidt residual analysis, or a Principal Components Analysis. In the same or alternative implementations, the matrix of numbers of 10 vectors is generated using the first 10 background scans. Also, in some cases the candidate scan correlates to the orthonormal basis set when a peak magnitude of the candidate scan correlates to a peak magnitude of the recent background measurement.

In some implementations the method may further comprise the steps of: stopping the collecting of candidate scans when a user initiates a sample scan; displaying a message to a user if the background measurement is older than the preselected time interval; measuring a sample; creating and saving a new sample description; and restarting the collecting of candidate scans.

Further, in some cases the method may further comprise the steps of: stopping the collecting of candidate scans when a user initiates a background scan; measuring a background; creating and saving a new background description; and restarting the collecting of candidate scans.

Additionally, in some implementations the plurality of candidate scans are collected when there is no sample present in the spectrometer.

An embodiment of a spectrometer is also described that comprises a source configured to generate infrared radiation; an interferometer configured to produce a plurality of candidate scans from the infrared radiation; a detector configured to collect the plurality of candidate scans; and a controller configured to perform the steps of: determining for each of the plurality of candidate scans if the candidate scan correlates to an orthonormal basis set that is associated with a recent background description; saving each scan that correlates to the orthonormal basis set as a background scan in a scan cache; and generating a new background measurement from a plurality of the background scans stored in the scan cache if a current background measurement is older than a preselected time interval.

In some implementations the preselected time interval is between approximately 30 minutes and approximately 60 minutes, or the preselected time interval includes an interval between the determination of two new background scans. Additionally, the orthonormal basis set may include a matrix of numbers of 10 vectors, and in some cases the candidate scan correlates to the orthonormal basis set when a peak magnitude of the candidate scan correlates to a peak magnitude of the recent background measurement. Further, in some instances, the plurality of candidate scans are collected when there is no sample present in the spectrometer.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
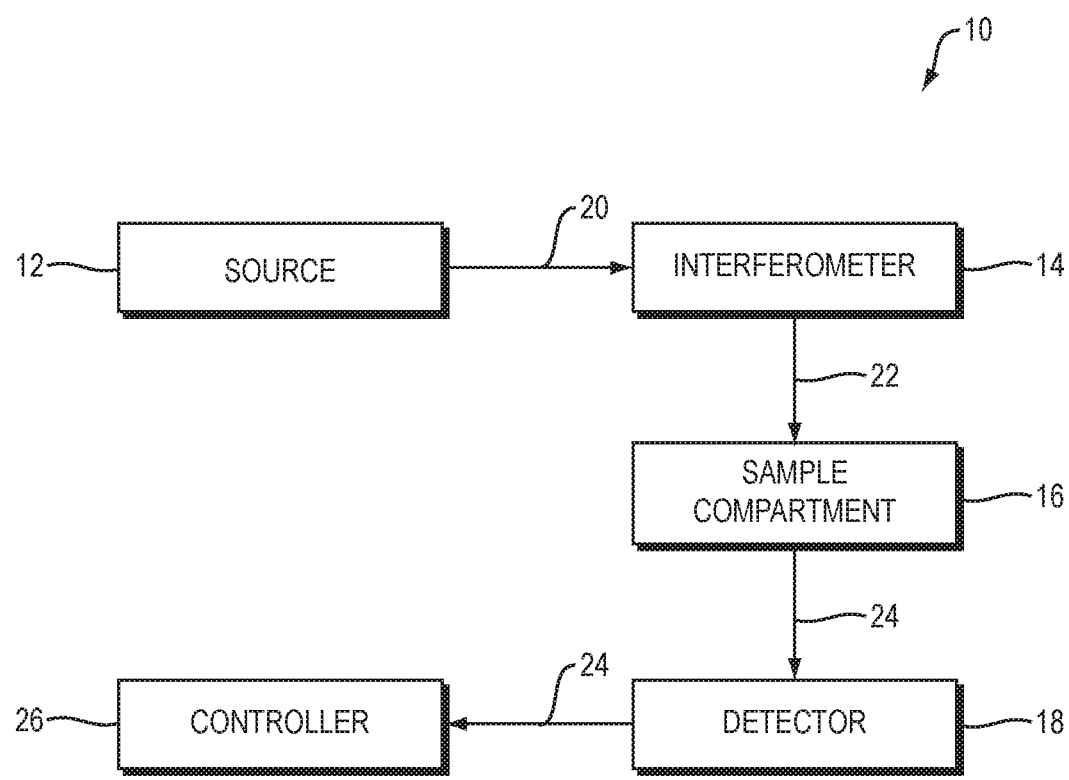
FIG. 1 is a schematic view of a spectrometer.

The figures referred to above are not drawn necessarily to scale, should be understood to provide a representation of particular embodiments, and are merely conceptual in nature and illustrative of the principles involved. Some features depicted in the drawings have been enlarged or distorted relative to others to facilitate explanation and understanding. The same reference numbers are used in the drawings for similar or identical components and features shown in various alternative embodiments. Background descriptions as disclosed herein would have configurations and components determined, in part, by the intended application and environment in which they are used.

DETAILED DESCRIPTION OF EMBODIMENTS

Referring to FIG. 1, a common FTIR spectrometer 10 includes an infrared ("IR") source 12, an interferometer 14, a sample compartment 16, and a detector 18. The source 12 may generate IR radiation 20, which may be collimated, and then is converted by interferometer 14 to generate a modulated signal 22 that irradiates a sample within sample compartment 16. The resulting IR signal 24 containing energy not absorbed by the sample is detected by the detector 18, and IR signal 24 is then processed by a controller 26 to produce an interferogram. Controller 26 may amplify and convert the IR signal to a digital signal by an amplifier and analog-to-digital converter (ADC), respectively (not shown), for processing with a Fourier transform to convert the interferogram to a frequency domain.

It is to be appreciated that controller 26 may be any type of general purpose computer. Controller 26 may also be a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps described herein with respect to spectrometer 10.

Interferometer 14 may be a Michelson interferometer, which splits the incoming beam of light into two beams such that the path of the two beams is different, in known fashion. The Michelson interferometer recombines the two beams and conducts them on to the detector where the difference of the intensity of these two beams is measured as a function of the difference of the paths. As is well known, a Michelson interferometer may include two perpendicular mirrors, one being stationary and one being movable. When the movable mirror is moved in a forward direction, the path length difference is increasing and the mirror velocity is optimized for acquiring data in what is known as a forward scan of the sample compartment. When the path length is decreasing, or retracing, the velocity is increased and can be considered a backwards scan. In certain embodiments, the collecting of a scan occurs only during forward scans of the moving mirror.

The readings from detectors are not actually instantaneous values, rather, the detector actually integrates the signal over some short period of time. The period of time is very small for some types of detectors (such as Mercury—Cadmium—Tellurium, or MCT) but still not zero. Other detectors such as deuterated triglycine sulfate ("DTGS") detectors actually integrate the signal for a fairly long time. When the interferometer is moving forward (increasing the mirror displacement) and data is acquired for a displacement N, the resultant data is an integration of the signal between displacement N−1 and point N. During a backward scan, there is an integration of the signal between point N and N+1. With a "slow" detector like a DGTS, the signal may actually be the integration of several points, depending on the velocity at which the mirror is moving. This difference makes a spectrum produced by signal averaging forward and backwards scans have subtle artifacts. Some of that can be eliminated by signal averaging the forward and backward scans separately and converting to the frequency domain with an FFT before adding the two frequency domain measurements. However, due to these additional complications, in certain embodiments a backward scan collection of data is not conducted.

When data is not collected on the backward scan, the mirror velocity is not limited to a speed that is appropriate for the detector, and the mirror can be retraced very quickly. Thus, acquiring N scans using only forward scans does not take twice as long as acquiring N scans if you collected data for forward and backward scans. During the retrace, firmware can be dedicated to housekeeping activities such as reading diagnostic information, including source voltage and board temperature, for example. It is to be appreciated that some of these readings may use the same inter-integrated circuit ("I2C") bus that the detector uses, and there can be conflicts if they are read while a scan is being acquired. Additionally, other activities can be conducted during the retrace, such as detection of accessory insertion/removal, which activities could also create conflicts while a scan is being conducted.

When there is no sample present in sample compartment 16, a background scan can be obtained and stored in controller 26. The stored background scan can then serve as a baseline to which a sample scan is compared. When a user desires to scan a sample with spectrometer 10, they need to be assured that the background measurement to be used corresponds to the current instrument profile of the settings of spectrometer 10 and ambient conditions. One way to accomplish this is to have the user initiate a new background measurement just prior to scanning their sample. However, the time required to create a new background measurement is typically equal to or greater than the time to measure the sample itself, resulting in an inefficient operation.

In accordance with certain embodiments, a current background scan can be obtained and stored on a regular basis while spectrometer 10 is idle, i.e. not in use in scanning a sample. The process of creating a new background measurement can be automated, thereby ensuring that when a user approaches spectrometer 10 they can be assured that a current usable background measurement exists, and they can simply insert their sample in sample compartment 16 and perform a scan. Thus, users are assured that the current instrument profile is accurately captured by the current background measurement so the sample spectrum displays spectral information derived solely from the sample the user has introduced into the system.

In certain embodiments, controller 26 may be configured to operate spectrometer 10 in an automated fashion such that candidate scans are regularly collected and new background measurements are generated at a preselected time interval, defining an automated scanning protocol. The candidate scans that are collected are then classified as background scans, scans that match the most recent sample (e.g. sample scans), or unknown scans. Background scans are stored by controller 26 in a scan cache for later use in generating a new background measurement. At each time interval defined in the automated scanning protocol, a new background measurement may be created based on a combination of the most recent background scans that match the current instrument settings (e.g. the background profile), if possible. In certain embodiments, only candidate scans that are newer than the current background measurement will be used to auto generate a new background measurement. It is to be appreciated that the number of background scans from the scan cache that are averaged or co-added together to produce a background measurement, can be selected by the user. In certain embodiments, the scan cache may contain up to 256 scans, some of which may be older than the current background measurement. In certain embodiments 16 or more background scans from the scan cache are used to make a background measurement. It is also to be appreciated that a user may initiate a background scan if desired, and that the same number of background scans may be used for user initiated background measurements and auto-generated background measurements.

It is to be appreciated that if a sample is left in place in sample compartment 16, generation of a new background measurement will fail, and there will be no new background scans stored by controller 26 in the scan cache while the sample remains in sample compartment 16. If the auto-generation of a new background measurement fails, the existing background measurement is left in place. In certain embodiments, controller 26 may be configured to warn the user when they initiate a sample measurement and the current background measurement is older than a particular time interval, such as 60 minutes, for example. This will allow the user to decide on their own if they would like to generate a new background measurement.

It is to be appreciated that the number of background scans from the scan cache that are averaged or co-added together to create a background measurement can be varied. In certain embodiments, a subset of the most recent 256 scans that have been identified as background scans may be averaged or co-added together to create a background measurement. All pertinent instrument settings may stored with each background scan so that when a new background measurement is needed, only scans that match the current instrument settings are used to generate the new background measurement. Exemplary instrument settings include, but are not limited to, the aperture size, the number of pre-peak points, resolution, and type of accessory being used. It is to be appreciated that sample scans and unknown scans may not be stored for any length of time by controller 26.

The term "approximately" as used herein is meant to mean close to, or about a particular value, within the constraints of sensible commercial engineering objectives, costs, manufacturing tolerances, and capabilities in the field of spectroscope manufacturing and use. Similarly, the term "substantially" as used herein is meant to mean mostly, or almost the same as, within the constraints of sensible commercial engineering objectives, costs, manufacturing tolerances, and capabilities in the field of spectroscope manufacturing and use.

When the automated scanning protocol operates, the scans need to be classified according to their state (e.g. background versus sample, etc.). One reason for classifying scans as sample scans is to ensure they are not mistakenly classified as background scans and used to generate a new background measurement.

When the system does a user initiated sample or background measurement, or when a background measurement is automatically generated through the automated scanning protocol, an orthonormal basis set is calculated from a subset of the data collected for the background measurement, and a new background description is created. The term "background description" as used herein generally refers to a description of the conditions in effect at the time a background measurement was made, as well as the data needed to compare any candidate scan to the background scans used to produce the background measurement being described.

The orthonormal basis set comprises a matrix of numbers of 10 vectors generated using Gram-Schmidt residual analysis, Principal Components Analysis, or any other suitable method of analysis from at least the first 10 background scans. At least 100 data points around the centerburst of the interferogram may be extracted from each of these 10 background scans and the orthonormal basis set may be generated from that subset of data points. The value of the average magnitude of the interferogram peak may be saved with the orthonormal basis set as well as the pertinent instrument settings. For example, the background description according to the classification includes the orthonormal basis set, peak magnitude and instrument settings. A separate background description is kept for each accessory that has been used in the instrument and each sample location that an accessory can be placed in. Each of these accessories are designed to handle a specific type of sample, such as a thin film or a powder. Each accessory has their own optical components that affect the optical path of the instrument when installed, which in turn affects the ambient conditions of the instrument and therefore the background profile of the instrument. In the presently described example, the variations in background profile make it desirable to record the accessory information as well as other instrument settings in the background description. On a simple instrument, this may be a maximum of about 10 background descriptions since there is only one sample location. However, any number of background descriptions may be stored according to technical complexity and/or user needs.

In certain embodiments, if there are less than 10 background scans available, no background measurement is generated. Using fewer than 10 background scans for a background is not typical for real measurements.

The data around the centerburst of the interferogram may be used because this is the region of the scan nearest to the interferometer's zero-path-difference position where there is the least destructive interference, resulting in the largest magnitude intensity readings. The larger magnitude values in this region are most likely to exhibit changes with varying instrument conditions. By using data from at least 10 background scans to produce the orthonormal basis set, a good representation of the scan-to-scan variability can be obtained without incurring excessive computation or storage requirements. Using data from fewer than 10 background scans may result in a reduced ability to recognize background scans.

In certain embodiments, the automated scanning protocol may automatically generate a new background measurement at a preselected time interval, e.g., between approximately 30 and approximately 60 minutes, for example. Given such an interval, the most recent background measurement may be updated frequently enough that the drift in instrument profile is small and new scans can accurately be classified as background scans. Alternatively, in some embodiments the preselected time interval for the automated scanning protocol may include automatically generating a new background measurement every time a new background scan is identified, which ensures that the background measurement always reflects the current instrument profile. The described embodiments provide the user with a background measurement that accurately represents the current profile of the instrument. For example, the preselected time interval may include an interval between the determination of two new background scans (e.g. the interval is between a first point in time upon the identification of a first background scan, and a second point in time upon the identification of a second background scan, where a new background measurement is created at both the first and second points in time).

Figure 2:
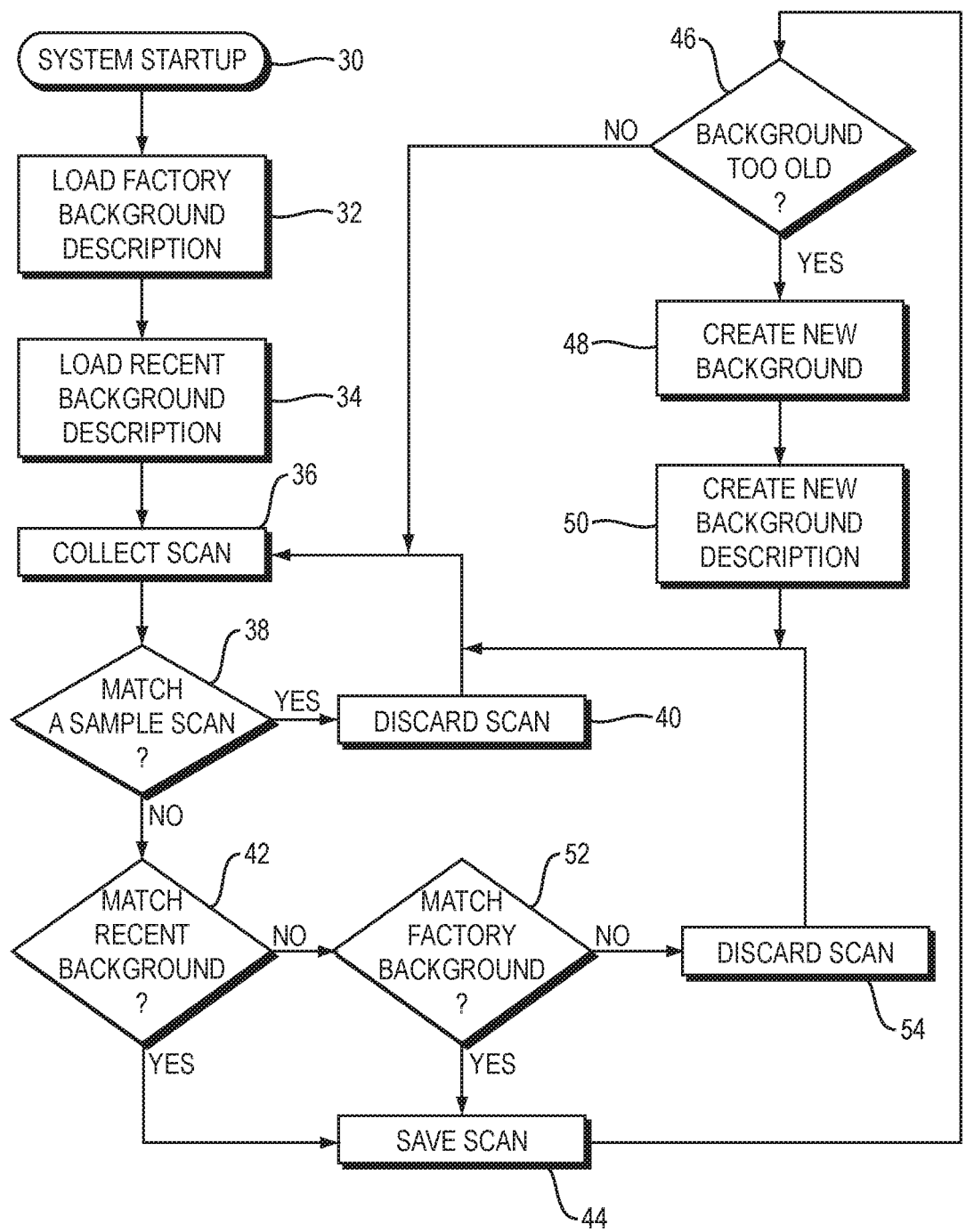
FIG. 2 is an example of an implementation of an automated scanning protocol using the spectrometer of FIG. 1.

A method of implementing the automated scanning protocol when the system is not doing a user initiated sample measurement can be seen in FIG. 2. At step 30, a system startup is performed and at step 32 any existing factory background descriptions are loaded into controller 26. These factory background descriptions are created by measuring background scans using a variety of settings under ideal conditions. At step 34 a recent background description is loaded (e.g. the most recent for the instrument configuration). At step 36 a candidate scan is collected.

At step 38 it is determined whether the collected candidate scan matches a recent sample description. To do so, the peak magnitude of the collected candidate scan is compared to the average peak magnitude of the most recent sample measurement. If the peak magnitude is between 80% and 150% of the average of all sample scans for the sample, a further check is done by calculating the Gram-Schmidt residual against the most recent sample orthonormal basis set. If this residual is less than an empirically determined threshold, the candidate scan is classified as a sample scan and is discarded. In certain embodiments, there is a different threshold used for the residual check depending on the accessory that is present in the instrument. In certain embodiments, the threshold for the residual may be approximately 0.02. In certain embodiments, the threshold for the residual may be approximately 0.01 when an attenuated total reflection (ATR) accessory is being used. It is to be appreciated that these thresholds can be adjusted programmatically and may change as testing is performed.

If at step 38 the candidate scan matches a recent sample description, the candidate scan is discarded at step 40, since no user has initiated either a sample scan or a background scan. This may occur if a sample has inadvertently been left in sample compartment 16. The system then collects another candidate scan at step 36.

If at step 38, the candidate scan does not match a recent sample description it is to be understood that it could be a background scan, or it could be because a different sample has been placed in the instrument. At step 42, it is determined whether the candidate scan matches the recent background description loaded at step 34. Alternatively, if the recent background description does not match the instrument configuration for some reason, other recently collected background descriptions can be searched to find a background description that matches the current instrument configuration. When a matching background description is found, the peak magnitude is compared between the candidate scan and the matching background description and the Gram-Schmidt residual is calculated and compared to the threshold. If the candidate scan is within the threshold, it is classified as a background scan and the candidate scan is saved as a background scan at step 44 in a cache of background scans in controller 26, along with all of the instrument settings that were in use at the time.

At step 46 the age of the recent background measurement is compared to a preselected interval to determine if the background measurement is too old. In certain embodiments, the preselected interval may be between approximately 30 minutes and approximately 60 minutes, or may include an interval between the determination of two new background scans (e.g. the interval is between a first point in time upon the identification of a first background scan, and a second point in time upon the identification of a second background scan, where a new background measurement is created at both the first and second points in time). It is to be appreciated that the preselected interval can be altered at any time in controller 26. If the age of the background measurement meets or exceeds the preselected interval, a new background measurement is created at step 48. To create a new background measurement, a selected number of background scans that are newer than the existing background measurement and have settings the match the current instrument settings are averaged or co-added to create a new background measurement. In certain embodiments, the most recent approximately 200 to approximately 300 background scans, more preferably the most recent approximately 225 to approximately 275 background scans, and most preferably approximately the most recent background 256 scans may be averaged together to create a new background measurement. At step 50 a new background description with the current instrument settings is then saved in controller 26. The system then collects another candidate scan at step 36.

If at step 46 it is determined that the age of the background measurement is less than the preselected interval, the system then collects another candidate scan at step 36.

If at step 42 the candidate scan does not match the recent background description loaded at step 34, it is determined at step 52 if the candidate scan matches a factory background description. The recent background description is compared to a list of background descriptions collected at the factory. If a matching factory background description is found at step 52, the same comparison as in step 42 is made to compare the peak magnitude the of the factory background description and the candidate scan and the Gram-Schmidt residual, and if the candidate scan is within the peak magnitude and residual thresholds it is classified as a background scan and added to the cache of background scans at step 44. The system then determines if the background is too old at step 46.

If the scan at step 52 does not match a factory background description, the candidate scan is discarded as an unknown scan at step 54. The system then collects another candidate scan at step 36.

Figure 3:
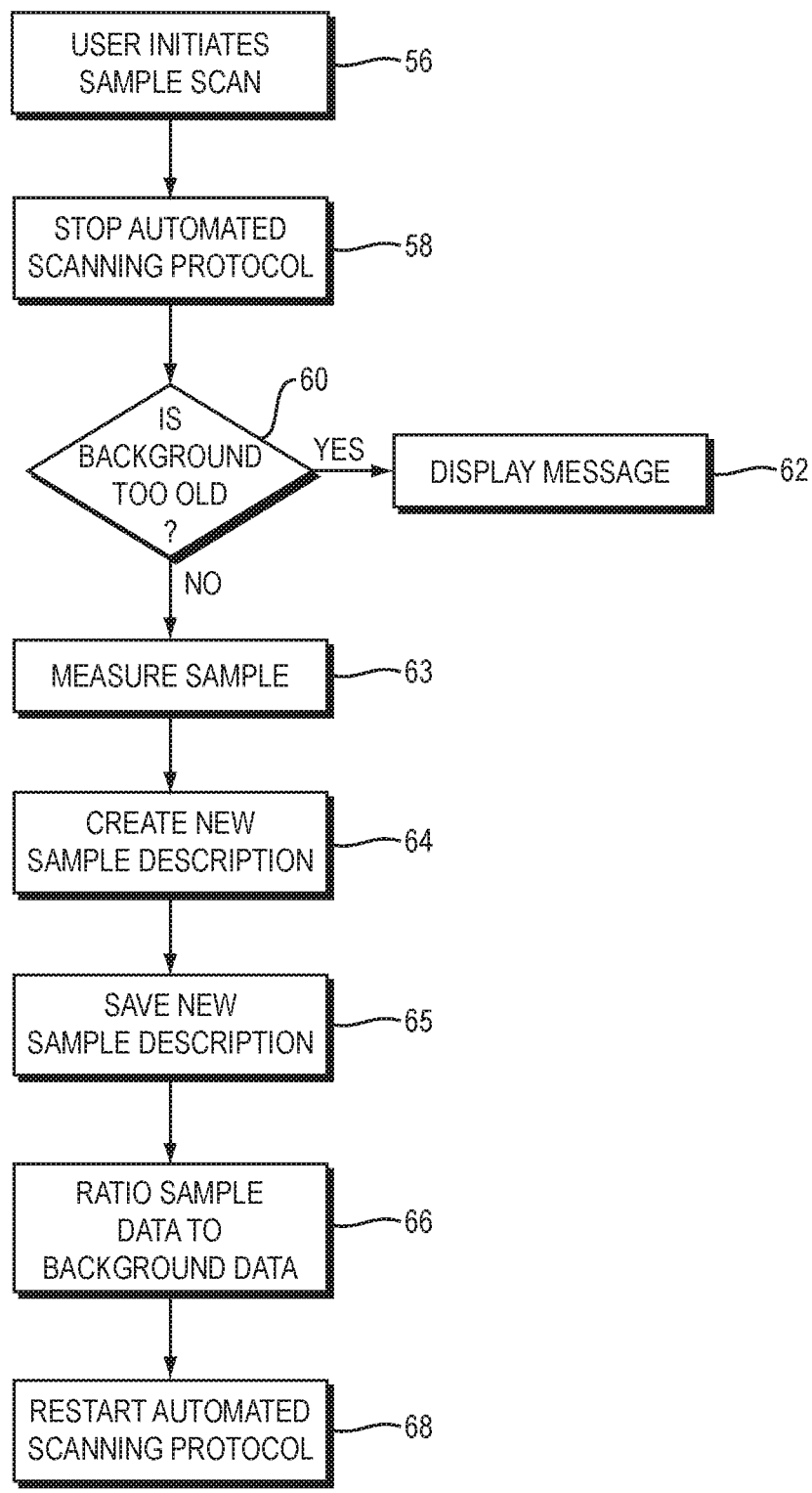
FIG. 3 is an example of an implementation of a user initiated sample scan using the spectrometer of FIG. 1.

The initiation of a sample scan by a user while the automated scanning protocol of FIG. 2 is in operation is illustrated in FIG. 3. At step 56 the user initiates a sample scan, and at step 58 the automated scanning protocol is stopped. At step 60 the age of the background measurement is compared to a preselected interval to determine if the background measurement is too old. In certain embodiments, the preselected interval may be between approximately 30 minutes and approximately 60 minutes, or may include an interval between the determination of two new background scans. It is to be appreciated that the preselected interval can be altered at any time in controller 26. If the background measurement is older than the preselected interval, a message is displayed at step 62 indicating to the user that the background measurement is older than the preselected interval. If it is determined at step 60 that the background measurement is not too old, the sample is measured at step 63. At step 64 a new sample description is created and it is saved in controller 26 at step 65. A ratio comparison of the sample measurement to the data from the current background measurement is then performed at step 66. At step 68 the automated scanning protocol is then restarted.

Figure 4:
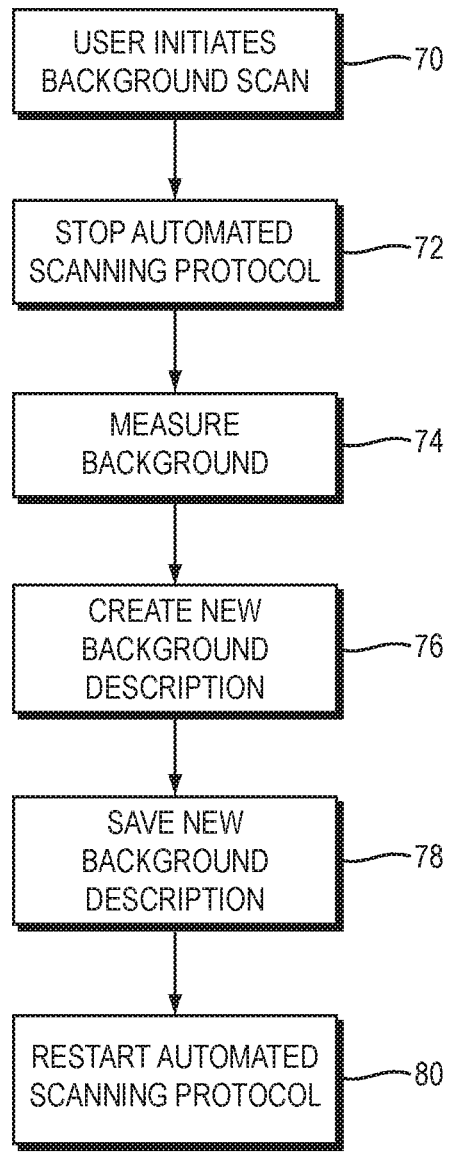
FIG. 4 is an example of an implementation of a user initiated background scan using the spectrometer of FIG. 1.

The initiation of a background scan by a user while the automated scanning protocol of FIG. 2 is in operation is illustrated in FIG. 4. At step 70 the user initiates a background scan, and at step 72 the automated scanning protocol is stopped. At step 74 the background is measured. At step 76 a new background description is created and it is saved in controller 26 at step 78. At step 80 the automated scanning protocol is then restarted. For example, controller 26 may coadd a user specified number of background scans to create a new background measurement. In the presently described example, data from the cache of background scans may not be used and controller 26 may not compare the background scans to any background descriptions.

An alternative approach to classifying candidate scans as a background or a sample is to perform an FFT on each scan and do a simple correlation calculation on each candidate scan against the most recent background measurement and sample measurement in the frequency domain. It has been found that this approach can be effective in correctly classifying candidate scans. However, it has the drawback of the increased processing needed to FFT each candidate scan. Also, by doing the classification in the frequency domain, it is not possible to classify candidate scans if the resolution of the measurement has changed since the last measurement. By doing the classification in the interferogram domain and only using the data around the centerburst, the resolution of the candidate scans being produced by the instrument is not a factor.

Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the invention. Substitutions of elements from one described embodiment to another are also fully intended and contemplated. The specific embodiments illustrated and described herein are for illustrative purposes only, and not limiting of the invention as set forth in the appended claims. Other embodiments will be evident to those of skill in the art. It should be understood that the foregoing description is provided for clarity only and is merely exemplary. The spirit and scope of the present invention are not limited to the above examples, but are encompassed by the following claims. All publications and patent applications cited above are incorporated by reference in their entirety for all purposes to the same extent as if each individual publication or patent application were specifically and individually indicated to be so incorporated by reference.

What is claimed is:

1. A method of automatically generating a background measurement in a spectrometer comprising the steps of:
   collecting a plurality of candidate scans in the spectrometer;
   determining for each of the plurality of candidate scans if the candidate scan correlates to an orthonormal basis set that is associated with a recent background description;
   saving each candidate scan that correlates to the orthonormal basis set as a background scan in a scan cache; and
   generating a new background measurement from a plurality of the background scans stored in the scan cache if a current background measurement is older than a preselected time interval.

2. The method of claim 1, wherein the background description includes instrument settings.

3. The method of claim 1, wherein the background description includes an interferogram peak magnitude.

4. The method of claim 1, wherein the candidate scans are forward scans.

5. The method of claim 1, wherein the preselected time interval is between approximately 30 minutes and approximately 60 minutes.

6. The method of claim 1, wherein the preselected time interval includes an interval between the determination of two new background scans.

7. The method of claim 1, wherein 256 background scans are saved in the scan cache.

8. The method of claim 1, wherein the orthonormal basis set comprises a matrix of numbers of 10 vectors.

9. The method of claim 8, wherein the matrix of numbers of 10 vectors is generated using a Gram-Schmidt residual analysis, or a Principal Components Analysis.

10. The method of claim 8, wherein the matrix of numbers of 10 vectors is generated using the first 10 background scans.

11. The method of claim 1, wherein the candidate scan correlates to the orthonormal basis set when a peak magnitude of the candidate scan correlates to a peak magnitude of the recent background description.

12. The method of claim 1, further comprising the step of:
stopping the collecting of candidate scans when a user initiates a sample scan;
displaying a message to a user if the background measurement is older than the preselected time interval;
measuring a sample;
creating and saving a new sample description; and
restarting the collecting of candidate scans.

13. The method of claim 1, further comprising the step of:
stopping the collecting of candidate scans when a user initiates a background scan;
measuring a background;
creating and saving a new background description; and
restarting the collecting of candidate scans.

14. The method of claim 1, wherein the plurality of candidate scans are collected when there is no sample present in the spectrometer.

15. A spectrometer comprising:
a source configured to generate infrared radiation;
an interferometer configured to produce a plurality of candidate scans from the infrared radiation;
a detector configured to collect the plurality of candidate scans; and
a controller configured to perform the steps of:
determining for each of the plurality of candidate scans if the candidate scan correlates to an orthonormal basis set that is associated with a recent background description;
saving each scan that correlates to the orthonormal basis set as a background scan in a scan cache; and
generating a new background measurement from a plurality of the background scans stored in the scan cache if a current background measurement is older than a preselected time interval.

16. The spectrometer of claim 15, wherein the preselected time interval is between approximately 30 minutes and approximately 60 minutes.

17. The spectrometer of claim 15, wherein the preselected time interval includes an interval between the determination of two new background scans.

18. The spectrometer of claim 15, wherein the orthonormal basis set comprises a matrix of numbers of 10 vectors.

19. The spectrometer of claim 1, wherein the candidate scan correlates to the orthonormal basis set when a peak magnitude of the candidate scan correlates to a peak magnitude of the recent background description.

20. The method of claim 15, wherein the plurality of candidate scans are collected when there is no sample present in the spectrometer.

* * * * *

UNITED STATES PATENT AND TRADEMARK OFFICE
CERTIFICATE OF CORRECTION

PATENT NO. : 11,067,499 B2
APPLICATION NO. : 16/802692
DATED : July 20, 2021
INVENTOR(S) : Peter Edward Knudtson Page 1 of 1

It is certified that error appears in the above-identified patent and that said Letters Patent is hereby corrected as shown below:

In the Claims

Claim 19, Column 12, Line 28: replace "The spectrometer of claim 1," with -- The spectrometer of claim 15, --, therefor Claim 20, Column 12, Line 32: replace "The method of claim 15," with -- The spectrometer of claim 15, --, therefor Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*